United States Patent
Fraidenburgh

(10) Patent No.: US 9,802,365 B2
(45) Date of Patent: Oct. 31, 2017

(54) HOLLOW WALL COMPOSITE TUBE, METHODS OF PRODUCTION AND USES THEREOF

(71) Applicant: Robert Burch Fraidenburgh, Woodside, CA (US)

(72) Inventor: Robert Burch Fraidenburgh, Woodside, CA (US)

(*) Notice: Subject to any disclaimer, the term of this patent is extended or adjusted under 35 U.S.C. 154(b) by 0 days.

(21) Appl. No.: 14/480,421

(22) Filed: Sep. 8, 2014

(65) Prior Publication Data

US 2014/0377490 A1  Dec. 25, 2014

Related U.S. Application Data

(63) Continuation of application No. 13/763,661, filed on Feb. 9, 2013.

(Continued)

(51) Int. Cl.
*B32B 1/08* (2006.01)
*B29C 70/30* (2006.01)
*A63B 60/06* (2015.01)
*A63B 53/10* (2015.01)
*B29K 63/00* (2006.01)
*B29K 307/04* (2006.01)
*B29L 23/00* (2006.01)
*B29L 24/00* (2006.01)
*B29L 31/52* (2006.01)
*A63B 59/70* (2015.01)

(52) U.S. Cl.
CPC .............. *B29C 70/30* (2013.01); *A63B 53/10* (2013.01); *A63B 60/06* (2015.10); *A63B 59/70* (2015.10); *A63B 2209/02* (2013.01); *B29K 2063/00* (2013.01); *B29K 2307/04* (2013.01); *B29L 2023/22* (2013.01); *B29L 2024/00* (2013.01); *B29L 2031/52* (2013.01); *B32B 2363/00* (2013.01); *B32B 2597/00* (2013.01); *Y10T 428/13* (2015.01); *Y10T 428/1362* (2015.01); *Y10T 428/1369* (2015.01)

(58) Field of Classification Search
CPC ....... B29C 70/30; B32B 1/08; B32B 2363/00; B32B 2597/00; Y10T 428/13; Y10T 428/1362; Y10T 428/1369; B29K 2063/00; B29K 2307/04; B29L 2023/22; B29L 2024/00; B29L 2031/52; A63B 2209/02; A63B 53/10; A63B 59/70; A63B 60/06
USPC ........................ 428/36.9, 36.1, 36.3; 156/187
See application file for complete search history.

(56) References Cited

U.S. PATENT DOCUMENTS

| | | | | |
|---|---|---|---|---|
| 5,028,464 A | * | 7/1991 | Shigetoh | A63B 53/10 156/173 |
| 5,968,621 A | * | 10/1999 | Okada | A01K 87/00 428/36.3 |
| 5,988,612 A | * | 11/1999 | Bertelson | B29C 53/12 267/148 |

* cited by examiner

*Primary Examiner* — Yan Lan
(74) *Attorney, Agent, or Firm* — Sandra Thompson; Finlayson Toffer Roosevelt & Lilly LLP

(57) ABSTRACT

A hollow wall composite tube for improving performance in sports shafts and lightweight structural members is disclosed that includes: a constituent tube, for forming the wall, that comprises: a flexible core component, for providing an adjustable shape on which to wind or braid filaments or fabric; and an adjustable shape hollow structure, for reducing weight, providing a path for the core to be evacuated, tightly conformed to the core, and tow, braid filaments or fabric, for providing a reinforcing fiber matrix for saturation with epoxy, spirally wrapped, applied or braided on the constituent tube. Methods of producing contemplated composite tubes are also disclosed.

10 Claims, 5 Drawing Sheets

Related U.S. Application Data

(60) Provisional application No. 61/606,186, filed on Mar. 2, 2012, provisional application No. 61/656,010, filed on Jun. 6, 2012, provisional application No. 61/671,700, filed on Jul. 14, 2012.

SECTION 1-1

DETAIL B
SCALE 5 : 1

HOLLOW WALL COMPOSITE TUBE, METHODS OF PRODUCTION AND USES THEREOF

This United States Continuation in Part Application claims priority to U.S. Utility application Ser. No. 13/763,661 filed on Feb. 9, 2013, which claims priority to U.S. Provisional Application Ser. No. 61/606,186 filed on Mar. 2, 2012; U.S. Provisional Application Ser. No. 61/656,010 filed on Jun. 6, 2012; and U.S. Provisional Application Ser. No. 61/671,700 filed on Jul. 14, 2012, all of which are commonly-owned and incorporated by reference in their entirety.

FIELD OF THE SUBJECT MATTER

The contemplated embodiments and subject matter disclosed relates to products made from composite tubing and, more particularly, to tubular items in which strength and weight are at a premium. Golf club shafts, tennis rackets, ski poles, hockey sticks, fishing rods, and arrows are some examples. Contemplated embodiments also relate to lightweight structural members used in aerospace, sailboats, automobiles, and bicycles.

BACKGROUND

Composite tubing is used for many products because of its high strength-to-weight ratio. When more strength is desired in a composite tube, options are limited. Material can be upgraded, and wall thickness can be increased. When less weight is desired, wall thickness can be decreased, or holes can be added through the wall. Also a standard composite tube is configured exactly like a tubular bell. Having a single, solid wall like a bell creates maximum vibration after striking an object or flexural release. It also transmits vibration most efficiently to the human hand and adjacent bone structure, or in the case of an assembly, to the connecting components.

Other solutions have involved substituting higher modulus fiber (generally carbon fiber), wrapping with filament or fabric at varying angles to create biased plies, using higher stiffness epoxy to increase strength, and decreasing wall thickness to decrease weight.

Decreasing wall thickness to reduce weight can have catastrophic results. A single unsupported wall is subject to distortion, vibration, buckling, even cracking and splitting. Increasing strength by thickening the wall adds weight. Changing material can increase strength, but within narrow limits. Changing material can increase cost.

Therefore, it would be ideal to develop and utilize a one piece composite tube having a hollow wall, wherein the outside and inside surfaces, along with the ends of the tube, may have standard surfaces and shapes suitable for bonding or fastening. Ideal composite tubes would have a hollow wall for light weight and strength, be resistant to vibration, while maintaining light weight, and would be resistant to distortion when flexed, loaded, or subjected to torque.

SUMMARY OF THE SUBJECT MATTER

A hollow wall composite tube for improving performance in sports shafts and lightweight structural members is disclosed that includes: a constituent tube, for forming the wall, that comprises: a flexible core component, for providing an adjustable shape on which to wind or braid filaments or fabric; and an adjustable shape hollow structure, for reducing weight, providing a path for the core to be evacuated, tightly conformed to the core, and tow, braid filaments or fabric, for providing a reinforcing fiber matrix for saturation with epoxy, spirally wrapped, applied or braided on the constituent tube.

A method of making a hollow wall composite tube for improving performance in sports shafts and lightweight structural members is also disclosed that includes: providing a mandrel; providing a constituent tube, for forming the wall, that comprises: a flexible core component, for providing an adjustable shape on which to wind or braid filaments or fabric, and an adjustable shape hollow structure, for reducing weight, providing a path for the core to be evacuated, tightly conformed to the core, providing tow, braid filaments or fabric, for providing a reinforcing fiber matrix for saturation with an epoxy material, spirally wrapped, applied or braided on the constituent tube; wrapping the constituent tube around the mandrel, so that the tube forms an internal surface that has a shape similar to the mandrel; wrapping, applying or braiding tow, braid filaments or fabric on to the tube; curing the tube; and removing the mandrel to form the composite tube.

DETAILED DESCRIPTION

According to disclosed and contemplated embodiments, a composite tube, wherein it has a one-piece configuration, but may have several layers, having a hollow wall has been developed, wherein the outside and inside surfaces, along with the ends of the tube, may have standard surfaces and shapes suitable for bonding or fastening. Contemplated composite tubes have a hollow wall for light weight and strength, are resistant to vibration, while maintaining light weight, and are resistant to distortion when flexed, loaded, or subjected to torque.

Specifically, a hollow wall composite tube for improving performance in sports shafts and lightweight structural members is disclosed that includes: a constituent tube, for forming the wall, that comprises: a flexible core component, for providing an adjustable shape on which to wind or braid filaments or fabric; and an adjustable shape hollow structure, for reducing weight, providing a path for the core to be evacuated, tightly conformed to the core, and tow, braid filaments or fabric, for providing a reinforcing fiber matrix for saturation with epoxy, spirally wrapped, applied or braided on the constituent tube.

Figure 5:
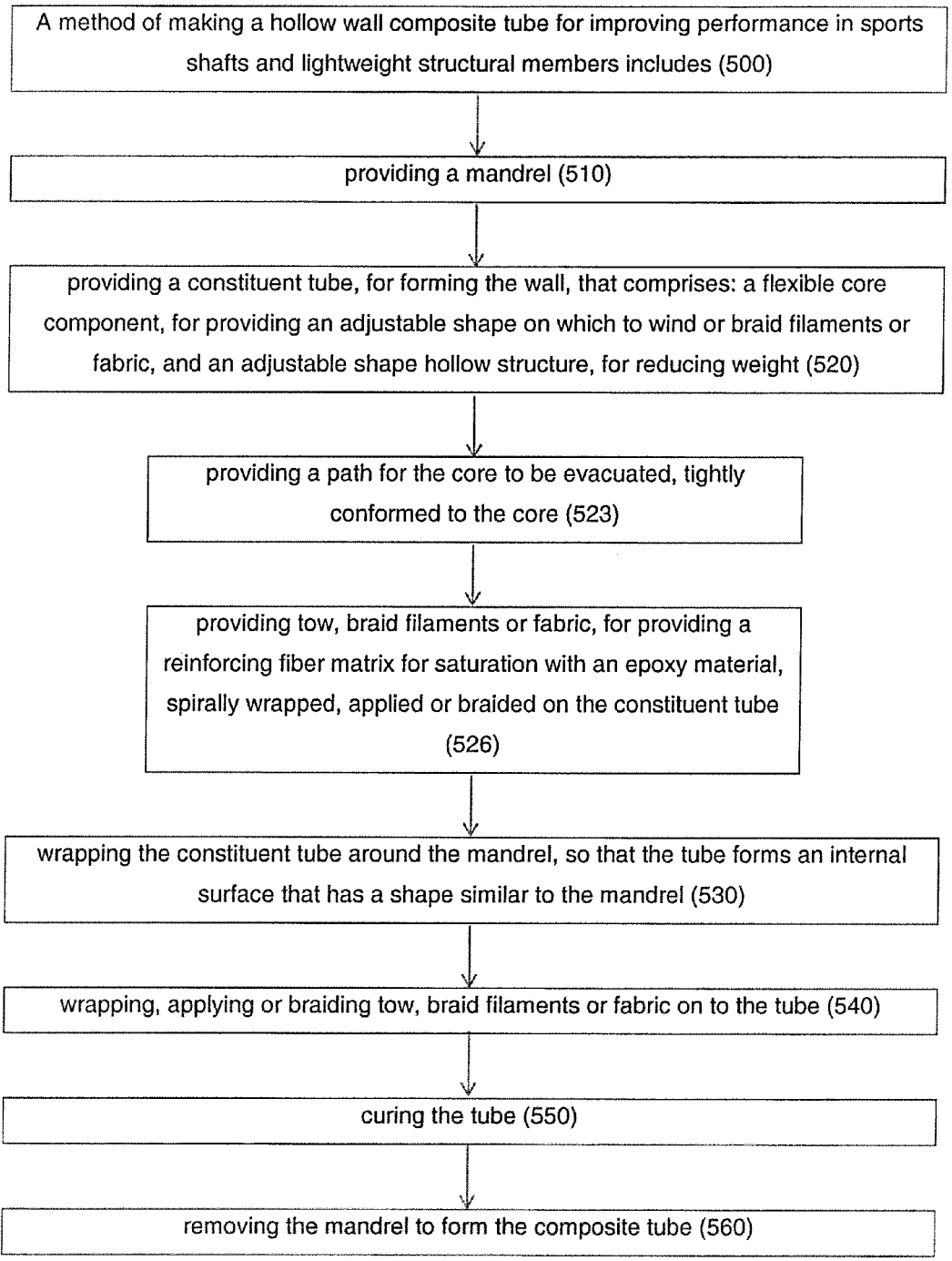
FIG. 5 shows a contemplated method.

A method 500 of making a hollow wall composite tube for improving performance in sports shafts and lightweight structural members is also disclosed and shown in FIG. 5 that includes: providing a mandrel 510; providing a constituent tube 520, for forming the wall, that comprises: a flexible core component, for providing an adjustable shape on which to wind or braid filaments or fabric, and an adjustable shape hollow structure, for reducing weight, providing 523 a path for the core to be evacuated, tightly conformed to the core, providing 526 tow, braid filaments or fabric, for providing a reinforcing fiber matrix for saturation with an epoxy material, spirally wrapped, applied or braided on the constituent tube; wrapping 530 the constituent tube around the mandrel, so that the tube forms an internal surface that has a shape similar to the mandrel; wrapping, applying or braiding tow 540, braid filaments or fabric on to the tube; curing 550 the tube; and removing 560 the mandrel to form the composite tube.

Figure 1:
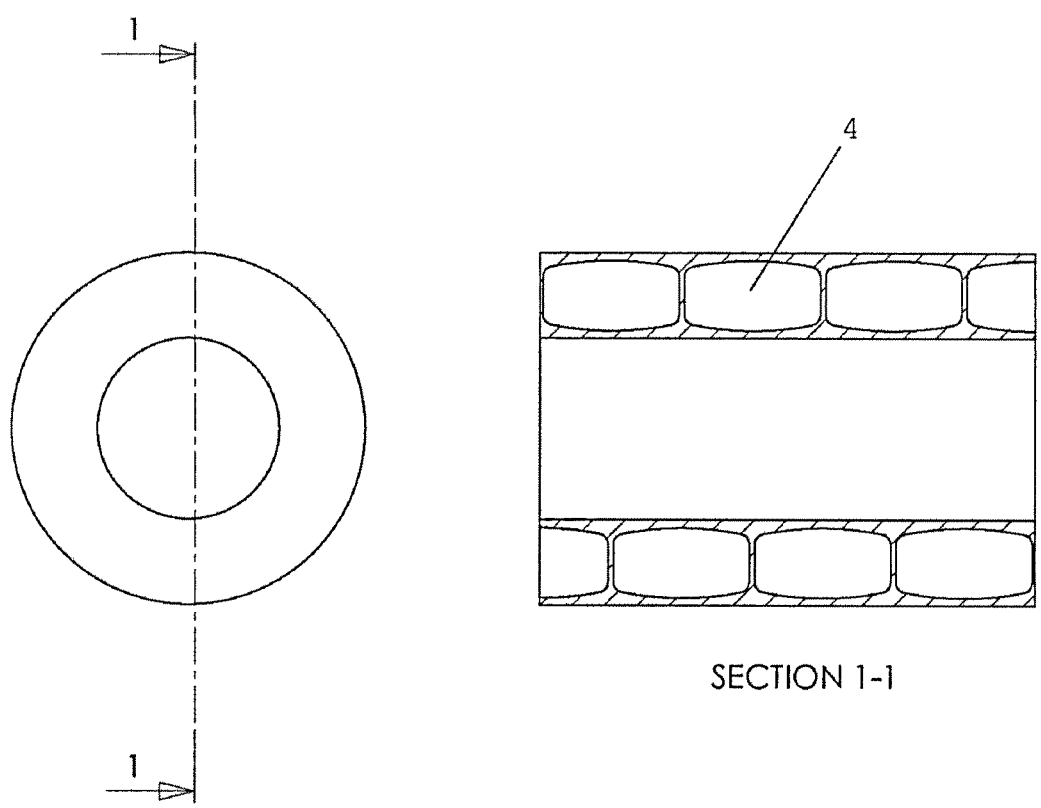
FIG. 1 is a section view of a hollow wall composite tube.

FIG. 1 is a sectional view of a hollow wall composite tube in accordance with contemplated embodiments. The sectional view in FIG. 1 is cut parallel to the axis of the tube. The hollow component or structure 4, which is formed as a part of the flexible core component as disclosed herein, shown is arched for strength and may comprise arched internal walls or internal surfaces, like an architectural arch. The shape of the hollow structure 4 can be tuned, sized or structured to optimize performance in a given application. For example, if the tube is to be used as a golf club shaft, subject to severe side loads, the arch shaped hollow structure 4 strengthens the wall against collapse. In contemplated embodiments, hollow wall composite tubes comprise internal or inner surfaces and outer or external surfaces.

Figure 2:
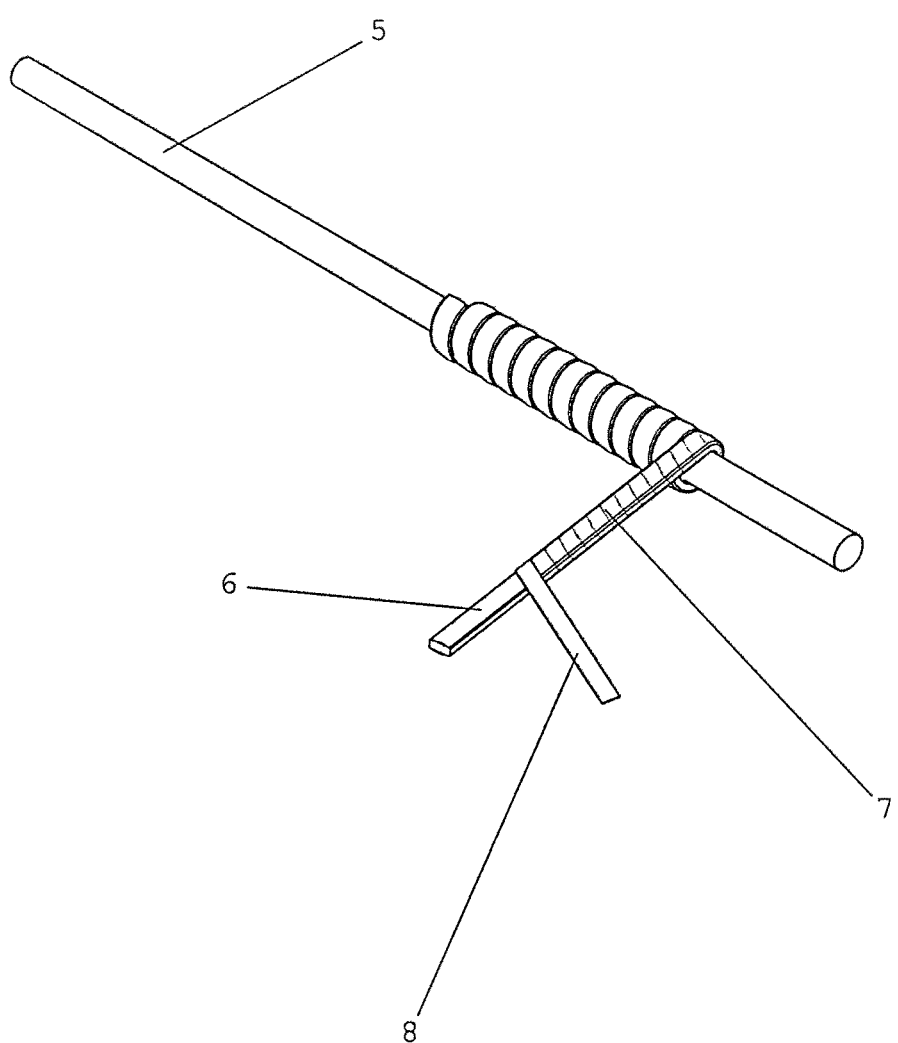
FIG. 2 is a perspective view of a flexible, shaped core, spiral wrapped with fiber or fabric, then spiral wrapped around a removable mandrel.

FIG. 2 is a perspective view showing constituent tube 7 being wound onto a removable mandrel 5. Once the mandrel 5 is removed, an adjustable shape hollow base is produced. The hollow base is going to be similar in shape to the mandrel 5, as expected.

Also shown is constituent tube 7 being produced by spiral wrapping a flexible core component 6 with tow (filaments) or fabric 8 prior to being wound on mandrel 5. Tuning of the hollow component 4 shape can be accomplished by changing the shape of core component 6. An elongated oval core 6 will produce an elongated oval hollow 4 after curing in a manner well known to those skilled in the art, and the solid core component 6 is removed or converted into the core component that comprises a hollow structure 4 by dissolving or melting. It is important to realize that there are two hollow structures. The first is the hollow structure formed inside of the core component 6 that is shown in FIG. 1. The second is the hollow base that is formed after the mandrel 5, shown in FIG. 2, is removed. In contemplated embodiments and as disclosed above, hollow wall composite tubes comprise internal surfaces and outer or external surfaces, and the internal surfaces can further comprise a layer of fabric or fiber. In other embodiments, the layer of fiber or fabric is conformed to the internal or inner surface.

Likewise a round or rectangular cross section core 6 (wrapped with fabric or filaments to form constituent tube 7) can produce a round or rectangular shaped hollow structure 4. Material used for making the core 6 may be wax, Styrofoam, or otherwise meltable or soluble materials. After curing, the core can be melted or dissolved, with the helically traversing hollow providing a path for the core to drain out, leaving hollow structure 4 empty.

If core 6 is tubing, it can be pressurized and the mold and mandrel 5 can hold the constituent tube 7 supported by the flexible core component 6, in a restrained position during epoxy cure, and the finish cured hollow base will have a shape corresponding to the mold and mandrel 5. At least one layer of flexible core component may be utilized, and in some embodiments, at least two layers of flexible core components may be utilized to form hollow wall composite tube.

Mandrels are commonly used for the "layup" of composite fiber fabric, or filament winding of composite fiber in the manufacture of composite tubes. Typically carbon fiber filaments (called "tow") or carbon fiber fabric is used, though other fibers and fabrics are also used. In a common method of producing composite tubing, tow or fabric is wrapped on the mandrel already "wetted out" (called a "prepreg") or encapsulated later, by injecting epoxy into the mold used to encapsulate the fibers and/or fabric.

In the manufacture of golf shafts, these mandrels are tapered and coated with mold release or wax to facilitate easy removal. The mandrel forms the internal surface of the tube, referred herein as the "hollow base", and typically a mold forms the outer surface of the tube. Mandrels can be made from hardened steel or other metal and re-used. Contemplated embodiments disclosed herein may have a ribbed interior on its inner surface, in the form of a shallow helical groove if constituent tube 7 is crowned, which is due to the helical track formed by constituent tube 7 having been spirally wound on mandrel 5.

If the hollow structure 4 is crowned or arched as shown in FIG. 1, there will be a small valley where the crowned winds of constituent tube 7 are tangent to each other. If the small valley on the internal surface of the finished tube is "unfilled" and thus the internal surface has ribs, then mandrel 5 extraction can be facilitated by rotating it, unscrewing it from the finished product. Leaving the internal surface unfilled and thus helically ribbed creates a slightly lighter structure without affecting aerodynamics if the shaft is to be swung through the air as with a golf shaft.

Or the ribbed inner surface of the tube to be produced may be filled between the crowned tops of the winds with fill, or just epoxy. This would produce a smooth inner surface in the finished tube. In this case the mandrel 5 can be extracted by pulling it straight out axially after curing in a manner well known to those skilled in the art. In contemplated embodiments, internal surfaces, external surfaces or a combination thereof of contemplated hollow wall composite tubes may be coated with, embedded with, saturated with or sprayed with an epoxy material.

To strengthen and fill between the crowned areas of the constituent tube 7, a narrow strip or strips of fiber or fabric can be wound on mandrel 5 before the constituent tube is wound onto mandrel 5, which can produce a smoother inside surface. Constituent tube 7 would necessarily be wound such that the crowned portion (if the preferred shape of hollow 4 is crowned) lies between the fill. So fill, consisting of stitching or fiber or fabric or any combination thereof, bridges the valley between the winds, and strengthens the area that would be prone to stress concentration.

Figure 4:
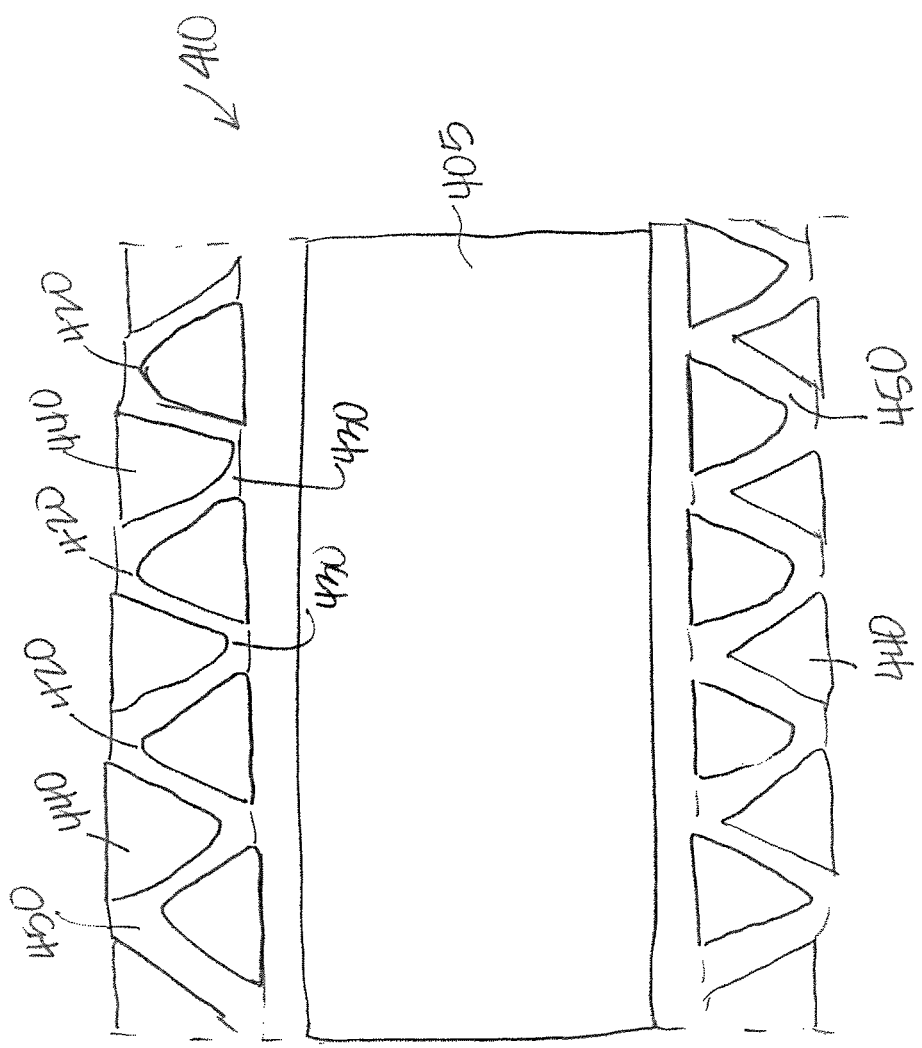
FIG. 4 is a section view of a contemplated hollow wall composite tube.

Contemplated fill may also comprise an additional constituent tube, as shown in FIG. 4, for example, if a triangular cross section constituent tube 410 is wound on the mandrel 405, the peaks 420 of the triangle will leave significant valleys 430 in between each wind around the mandrel. These peaks can be filled by another layer 440 of the same constituent tube, wherein it is inverted to put the peaks of the second layer in the valleys of the first layer. An epoxy or filler 450 may be used to adhere the layers to one another or to fill in the crevices between the layers.

If core 6 is not pressurized with fluid or air, the winds of constituent tube 7 can be stitched together with carbon fiber thread, aramid fiber thread, or other suitable thread. This stitching can be done while constituent tube 7 is wound on the mandrel 5 or in combination with a strip or strip of tow or fabric 8 to fill the small unfilled area between the ribs, in accordance with the disclosures in provisional patent applications 61/656,010 and 61/671,700, which form part of the basis for priority for this application.

If the unfilled area on the outer surface is filled by strips of fabric or stitching, or both, the fiber content of the finished composite tube will be greater, resulting in higher strength. Likewise fill can be added in the helically traversing valley on the outer surface of the pre-molded tube that would be formed by using a crowned core 6 inside constituent tube 7.

Further strengthening of the outer surface can be accomplished by wrapping, in a manner well known to those skilled in the art, with carbon fiber fabric or filament winding or any combination, forming an outer sleeve. Likewise strengthening of the inner surface can be accomplished by wrapping the mandrel 5 with fabric or fiber before the constituent tube 7 is deposited on it, forming an inner sleeve.

In FIG. 2, an end portion of constituent tube 7 is shown extended into the foreground, containing core 6. In the finished product, this extended portion would not be present. Both ends would be cut perpendicular to the tube axis like a standard tube cut to length. Contemplated embodiments wound construction is in accordance with the disclosures of provisional patent applications 61/656,010, 61/606,186, and 61/671,700, specifically FIG. 1 of each of the three listed provisional applications.

Both FIG. 1 and FIG. 2 show a random length of contemplated embodiments.

Figure 3:
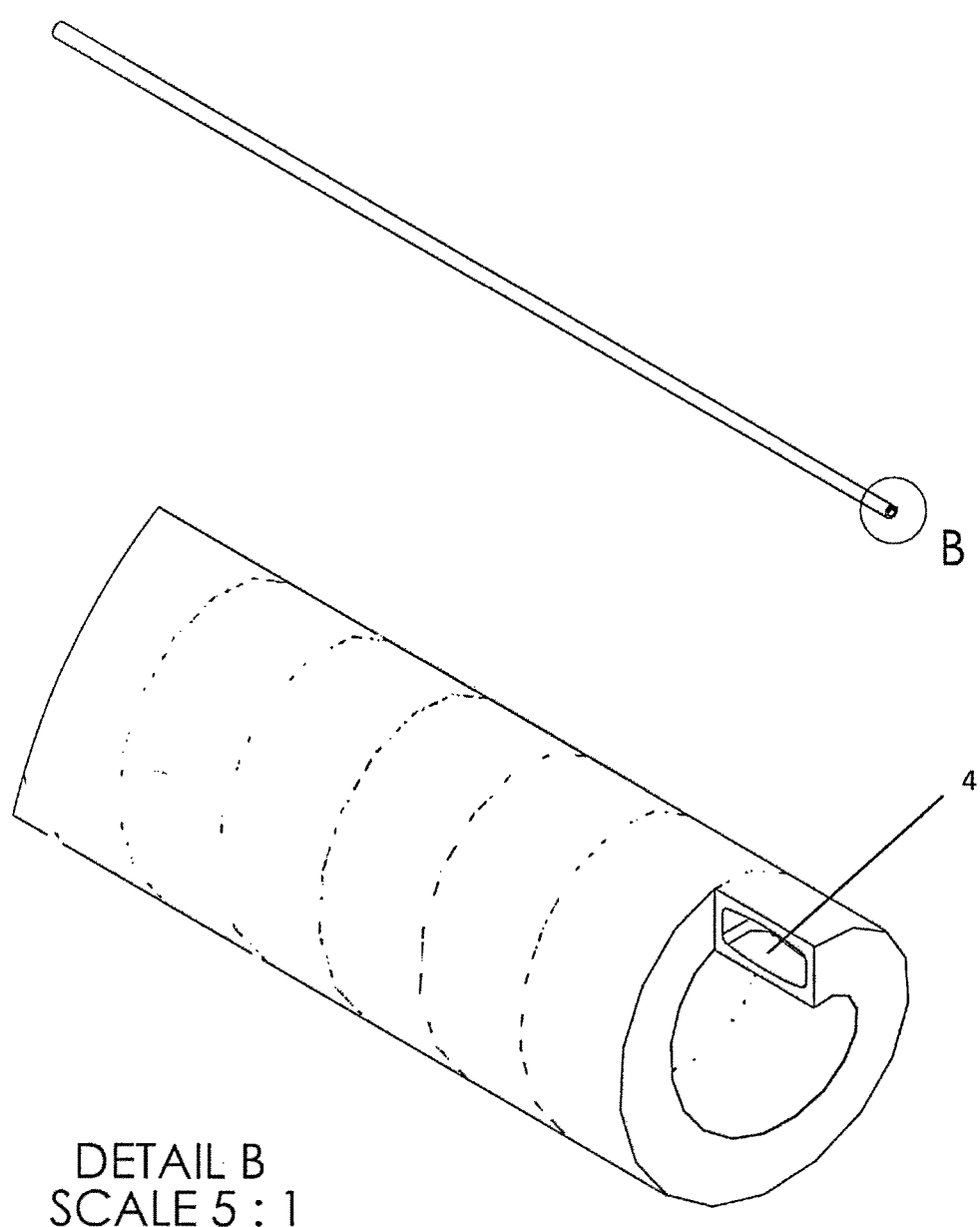
FIG. 3 is a perspective view of a finished hollow wall composite tube with the hollow wall on one end exposed in detail.

FIG. 3 shows a contemplated embodiment configured as a golf shaft, mandrel 5 having been removed and core 6 melted or dissolved out or bonded in. In the case of many golf shafts, the tube would be about 46 inches long. The gripped end would be approximately ⅝" diameter for an adult golf club, tapering smaller toward the clubhead end in the foreground.

Thus, having suitable epoxy, tow and/or fabric, core material, a mandrel and a mold, those skilled in the art can wind the tow or fabric on a shaped core, wind that wrapped core around a mandrel, and clamp the assembly in a mold, the fiber having been pre-impregnated or to be encapsulated by epoxy injection while in the mold.

After epoxy cure, the mandrel can be removed and the core liquefied and drained out (or in the opposite order), or in the case of a bonded in core, pressure is turned off to the core. Then the mold is opened, and the finished tube removed from the mold. The mold may be opened any time after full cure, but for dimensional stability, it is usually preferable to open it as the last operation.

Thus, specific embodiments of hollow wall composite tubes and their methods of manufacture and use have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A hollow wall composite tube for improving performance in sports shafts and lightweight structural members, comprising:
    a constituent tube, for forming the hollow wall composite tube, that comprises:
        a flexible core component having an outer surface and an inner surface, wherein the flexible core component provides an adjustable shape on which to wind or braid filaments or fabric, and wherein the flexible core component is hollow, for reducing weight, providing a helical hollow path;
        and two, braid filaments or fabric, for providing a reinforcing fiber matrix for saturation with an epoxy material, spirally wrapped, applied or braided on the outer surface of the flexible core component.

2. The hollow wall composite tube of claim 1, wherein the hollow wall composite tube comprises an internal surface and an outer surface.

3. The hollow wall composite tube of claim 2, wherein the internal surface further comprises a layer of fabric or fiber.

4. The hollow wall composite tube of claim 3, wherein the layer of fabric or fiber is conformed to the internal surface.

5. The hollow wall composite tube of claim 2, wherein the internal surface, the external surface or a combination thereof is coated with an epoxy material.

6. The hollow wall composite tube of claim 2, wherein the internal surface, the external surface or a combination thereof is saturated with an epoxy material.

7. The hollow wall composite tube of claim 1, wherein there is at least one layer of flexible core component.

8. The hollow wall composite tube of claim 7, wherein there is at least two layers of flexible core component.

9. The hollow wall composite tube of claim 1, used as part of a golf club, a tennis racket, a ski pole, a hockey stick, a fishing rod or an arrow.

10. A golf club, a tennis racket, a ski pole, a hockey stick, a fishing rod or an arrow, wherein a portion of each comprises a component formed from the hollow wall composite tube of claim 1.

* * * * *